July 25, 1961  A. M. BUECHE ET AL  2,993,809
METHOD FOR MAKING TREATED SILICA FILLERS
Filed Oct. 23, 1959
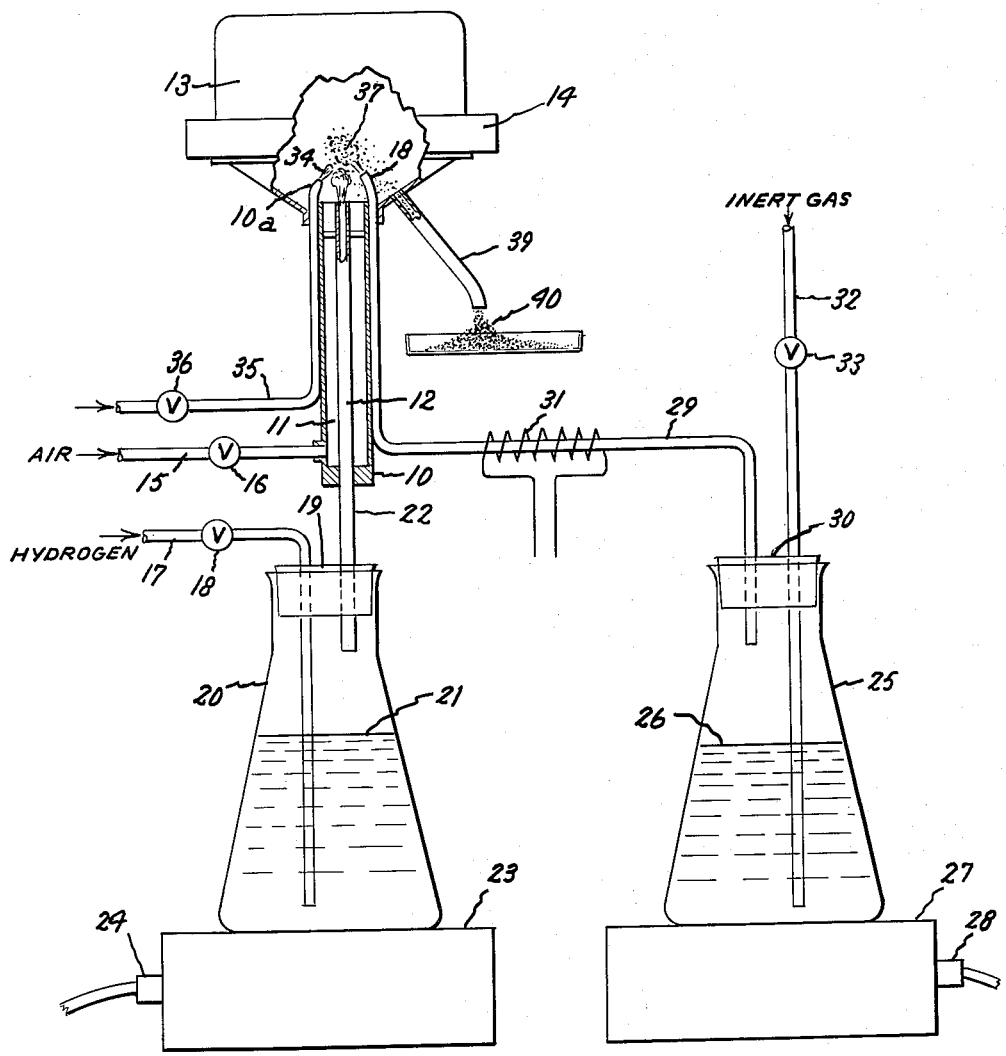
Inventors:
Arthur M. Bueche,
Curtis S. Oliver,
by Joseph T. Cohen
Their Attorney.

2,993,809
METHOD FOR MAKING TREATED SILICA FILLERS

Arthur M. Bueche and Curtis S. Oliver, Schenectady, N.Y., assignors to General Electric Company, a corporation of New York
Filed Oct. 23, 1959, Ser. No. 848,286
5 Claims. (Cl. 117—100)

This invention relates to a method for treating certain silica fillers and, more particularly, the invention is concerned with a method for obtaining such treated fillers which comprises contacting newly formed fume silica, e.g., hydrated fume silica, with an organohydrolyzable silane having the formula $$R_mH_nSiX_{4-(m+n)}$$

where R is a monovalent hydrocarbon radical, X is a hydrolyzable radical selected from the class consisting of halogen (e.g., chlorine, bromine, fluorine, etc.) and alkoxy radicals (e.g., methoxy, ethoxy, propoxy, isopropoxy, butoxy, etc.), $m$ is an integer equal to from 1 to 3, $n$ is a whole number equal to from 0 to 2, the sum of $m+n$ being equal to at most 3.

In the specification and the claims thereto appended, the term "fume silica" is intended to mean a reinforcing finely divided silica formed by the combustion of silicon tetrachloride in a stream of hydrogen and air (e.g., the oxygen contained in air). The reaction to produce a fume silica can be considered as the burning of hydrogen and oxygen to provide water and this water in turn hydrolyzing the silicon tetrachloride to give the fume silica or finely divided silica ($SiO_2$). The term "hydrated fume silica" is intended to mean the above-formed fume silica immediately that it issues from the combustion zone in which the fume silica is formed containing an amount of water in combination with said finely divided silica which interacts with the organohydrolyzable silane used for treating purposes.

Fume silicas are now produced commercially and are sold by various companies such as by Godfrey L. Cabot Company as "Cab-O-Sil" and by Degussa as "Aerosil." As pointed out above, these finely divided silicas are obtained by the combustion of hydrogen and oxygen in the presence of silicon tetrachloride. These fume silicas because of their finely divided state and large surface area, have found eminent use as reinforcement pigments for various binders, particularly rubbers. One of the more useful applications for these fume silicas has been as a reinforcing agent for silicone rubber. It has been found that the incorporation of fume silica in silicone rubbers markedly increases the tensile strength of the cured silicone rubber and imparts thereto excellent elongation without any sacrifice in the heat resistance and rubbery characteristics of the silicone rubber.

However, some difficulty has been encountered in using these fume silicas as reinforcing agents for silicone rubber. Thus, it has been found that when these fume silicas and uncured silicone rubber gums stand together even for short periods of time, for instance, as little as one day, the composition becomes tough and nervy. This toughness and nerve of the filled silicone rubber (also identified as "curable organopolysiloxane") which is also known as "structure" are recognized by the presence of an undesirable snap and difficulty in rendering these rubber compounds plastic by usual mechanical working. In extreme cases the filled gum is brittle and dry and crumbles when milled on compounding rolls. After incorporation of the structure-inducing fillers in the convertible organopolysiloxane, it will also be found that after the filled compound is stored any length of time, from about 2 days to several months, this toughness and nerve have increased to such a point that excessive milling time is required to form a plastic continuous film around the faster roll of a two roll differential mill (whose rolls are operating at different speeds) normally used for rendering stored compound plastic prior to further processing of the latter, such as, for instance, for the purpose of incorporating other fillers and additives, such as curing agents, compression set additives, etc., or for "freshening" the rubber compound so as to give better flow in subsequent molding, calendering or extrusion operations.

One of the more successful methods for overcoming this structure formation has been to treat the filler with various treating agents, particularly organosilicon compositions. One method comprises mixing together the fume silica with an organochlorosilane (preferably in the form of a solution of the latter and a solvent) by mechanical mixing and thereafter adding to said mixing water or relying on excessive moisture present on the surface of the silica filler to effect hydrolysis of the chlorosilane to the organopolysiloxane state, thereafter removing the excess organochlorosilane, and drying the treated filler to remove excess water present as well as HCl which may be formed and which of necessity must be removed from the filler prior to incorporation in the silicone rubber.

Another method for treating these fume silicas comprises contacting the fume silica with an organopolysiloxane, particularly a cyclic polydimethylsiloxane, for instance, octamethylcyclotetrasiloxane, as is more particularly disclosed by Glennard R. Lucas in his patent, U.S. Patent No. 2,938,009, issued May 24, 1960, and assigned to the same assignee of the present invention.

However, all of the prior methods for treating fume silica are attended by various difficulties. When the fume silica is treated, for instance, in solution form with an organohydrolyzable silane, for instance, trimethylchlorosilane, it is necessary that the treated filler be isolated physically from the reaction mixture, that it be heated to remove HCl and also to insure that there is no entrapped organohalogenosilane on the individual fume silica particles. Furthermore, it is also essential to use rather expensive equipment for bringing the fume silica and the organohalogenosilane in contact with each other.

The treatment of the fume silica with organopolysiloxanes as more particularly disclosed in the above-identified Lucas patent requires prior hydrolysis of an organohydrolyzable silane to form the organopolysiloxane used to treat the fume silica, and careful isolation of the desired organopolysiloxane. Even after treatment of the fume silica with the organopolysiloxane, in many instances, it may be necessary to employ an additional step of removing any excess organopolysiloxane in order to recover the latter due to the expense of this material.

Unexpectedly we have discovered that we can obtain a fume silica treated with an organosilicon composition by a process which uses a monomeric organosilane for treating purposes, requires removal of any hydrogen halide only once (in contrast to the prior methods requiring twice removing HCl, once when making the silica and the second time when the organochlorosilane is hydrolyzed) in obtaining a treated filler, and that the treatment of the fume silica can be accomplished with essentially the same equipment that is used to make the fume silica initially.

It is accordingly one of the objects of this invention to prepare a treated fume silica rapidly and efficiently with a minimum of processing.

A still further object of this invention is to obtain a treated fume silica (i.e., a hydrophobic fume silica) which is in a finely divided state.

It is another object of the invention to obtain a finely divided readily flowable fume silica in which there is an intimate treatment of each of the particles of the fume silica with an organosilicon composition to deposit uniformly an organosilicon compound on the surface of each particle.

Other objects of this invention will become apparent from the description thereof which follows.

In accordance with our invention we bring an organhydrolyzable silane having the formula recited above in contact with the fume silica as fine gas dispersed particles immediately after the fume silica is formed in the manner previously recited. One specific embodiment of the invention comprises passing hydrogen through silicon tetrachloride to entrain the latter and thereafter bring the entrained silicon tetrachloride and hydrogen into contact with air (or with oxygen) under combustion conditions and thereafter as the finely divided fume silica leaves the area of combustion, immediately subjecting the finely divided particles still in the dispersed phase to the vapors of an organohydrolyzable silane. In carrying out our process, it is essential that the amount of hydrogen used to entrain the silicon tetrachloride and used to carry the silicon tetrachloride to the point of combustion with the oxygen (the term "oxygen" is intended to cover both pure oxygen or the oxygen in the air) is well in excess of that required for converting all the silicon-bonded chlorine atoms in the silicon tetrachloride to silanol groups, which are in turn caused to condense to form the finely divided silica or fume silica. The amount of hydrogen ordinarily employed for merely making the fume silica is generally only that required to give sufficient moisture for hydrolysis of the chlorine in the silicon tetrachloride. However, in our process there must be an additional source of moisture or water available to effect the hydrolysis of the organohydrolyzable silane.

In carrying out the process, several critical features are essential. In the first place as pointed out above, the amount of entraining hydrogen used to carry the silicon tetrachloride must be in excess of that required to form sufficient water not only to hydrolyze the silicon tetrachloride to the fume silica state, but also to hydrolyze the organhydrolyzable silane. In addition, it is also important and essential that the organohydrolyzable silane not be allowed to come in contact with the fume silica in the combustion area maintained at elevated temperatures so as to avoid carbonization of the organohydrolyzable silane, thereby reducing its efficiency. One means for carrying the organohydrolyzable silane (hereinafter referred to as "organosilane") into the zone in which the treatment of the fume silica will be carried out, comprises passing an inert gas as an entraining agent through the organosilane and by means of the entraining gas, bringing it into contact with the fume silica. Among such inert gases may be mentioned nitrogen, helium, etc.

The method of the present invention in part is based on the chemical reaction between two moles of hydrogen, one mole of silicon tetrachloride, and one mole of oxygen to yield one mole of silica, that is fume silica, in extremely divided form (of particle size ranging in overall diameter of from 1 to 100 microns or higher) and 4 moles of hydrogen chloride. The additional moisture or water required to effect the hydrolysis of the organosilane when it comes in contact with the fume silica is furnished by employing additional amounts of hydrogen and oxygen over and above that required to effect hydrolysis of the silicon tetrachloride to the fume silica state. Thus, for a minimum attainment of the object of this invention, it is, therefore, essential that more than two moles of hydrogen and more than one mole of oxygen be used for each mole of silicon tetrachloride. In general, we may employ from about 2.1 to 4 or more moles of hydrogen per mole of silicon tetrachloride being entrained with the hydrogen and at the same time employing an adequate amount (at least about 1.05 moles) of oxygen to effect reaction with the hydrogen to form the moisture required for both hydrolysis of the silicon tetrachloride and hydrolysis of the organosilane. One of the particular advantages of our process resides in the fact that we can employ not only organohalogenosilanes but also organoalkoxysilanes. In the usual hydrolysis of organoalkoxysilanes to the polysiloxane state, it is generally necessary to employ an acidic medium, for instance, HCl, to induce the hydrolysis and condensation reactions to proceed. Because of the presence of HCl resulting from the hydrolysis of the silicon tetrachloride to the fume silica state, one has already available the necessary catalyst for converting organoalkoxysilanes to the polysiloxane state upon contact with the fume silica containing water of hydration.

The heat generated by the initial reaction between the silicon tetrachloride, hydrogen and oxygen is sufficient to insure that all of the materials except silica is in the gaseous state thus providing one means for removing a considerable part of the HCl present on the fume silica. The silica formed is in the form of a fume or smoke of finely divided particles, which are extremely active and because of the presence of moisture thereon react rapidly with the organosilane which comes in contact with each of the particles. An important advantage derived from the practice of our process resides in the fact that we are able to obtain discrete non-cohering particles of fume silica which are quite flowable and in a very finely divided non-agglomerated state. Prior methods of making fume silica, where there is no simultaneous conjoint treatment of the fume silica with the organosilane, is accomplished in such a manner that the fume silica is deposited on a surface from which the fume silica is scraped to obtain the desired product. Because of the condition of the fume silica resulting from prior processes of manufacture, the particles of silica tend to agglomerate and therefore are in less discrete particle form than is possible if one treats the fume silica simultaneously as we are able to do by our process whereby non-adhering particles are formed and they are of a free-flowing nature.

Our invention, together with the further objects and advantages thereof, may be best understood by reference to the following description taken in connection with the drawing which is a view, partly in section, of apparatus for effecting reaction between the hydrated fume silica and the organosilane under proper conditions.

In the simple figure of the drawing is shown an apparatus comprising a burner 10 having two concentric passages 11 and 12. These passages 11 and 12 extend into the interior portion of a reaction chamber 13 which is positioned and held in place, for instance, by a holder illustrated at 14. Passageway 11 is provided with means for delivering oxygen (or air) to the interior of the reaction chamber, including conduit 15 which contains valve 16 for regulating the rate of oxygen supplied. Generally, oxygen supplied by means of an air stream flows through conduit 15 and into passageway 11 to the upper end of burner 10. Both hydrogen and silicon tetrachloride are supplied to the end of the burner by means of passageway 12. Hydrogen is introduced into the system through conduit 17 containing valve 18 for regulating the rate of hydrogen flow. Conduit 17 extends through seal 19 into the base of a vessel 20 which contains liquid silicon tetrachloride 21. The base of conduit 17 is positioned below the surface of the silicon tetrachloride so as to cause the hydrogen to bubble through the silicon tetrachloride and become saturated with the silicon tetrachloride and thereby volatilize with the silicon tetrachloride entrained therein. The hydrogen which is then saturated with silicon tetrachloride passes through seal 19 by means of conduit 22 into passageway 12 and then to the tip 10a of the burner 10.

The amount of silicon tetrachloride picked up by the hydrogen passing through passageway 12 is controlled by regulating the temperature of the silicon tetrachloride. As the temperature of the silicon tetrachloride is raised, the amount of silicon tetrachloride entrained with the hydrogen will increase and, of course, as the temperature is lowered, the amount of silicon tetrachloride rising with the hydrogen will decrease. The temperature of the silicon tetrachloride in vessel 20 can be controlled by means of a heater 23 which is illustrated as an electric heater with connector 24 for supplying the necessary electricity. It should, however, be understood that any type of heating means may be employed to obtain the temperature desired in vessel 20. Thus, instead of employing an electric heater of the type illustrated, the heating may be provided by a heating mantel or by a burner or the like.

In order to supply the organosilane to the point of contact of the fume silica shown by finely divided dispersion 37, a container 25 of the organosilane 26 is provided. In the drawing, the container 25 is additionally provided with heating means 27 which is shown in the form of an electric hot plate having electrical connection means 28, which heating means may be any one of the type desired including various types of burners. Conduit 29 is provided with a tip 38 so that the vapors of the organosilane 26 may be delivered to the zone in which the fume silica is being produced at the tip 10a of burner 10. As illustrated, flask 25 is provided with a seal 30 through which conduit 29 extends. In order to prevent any condensation of the vapors of the organosilane and also in order to accelerate the evolution of the organosilane, heating means 31 may be provided around conduit 29, such heating means being, for instance, a resistance heater, but it being apparent that any other type of heating means may be employed. Additional means for facilitating delivery of the organosilane to the zone of contact with the hydrated fume silica 37 close to the tip of burner 10, are provided by bubbling an inert gas such as nitrogen, helium, etc., through organosilane material 26. This inert gas becomes saturated with the vapors of the organosilane and this saturated gas flows through conduit 29 to the zone of reaction out through tip 10a, but outside the flame 34 and the heated zone generated by the reaction of the hydrogen and the oxygen in the reaction with the silicon tetrachloride to form the fume silica. Specifically, the inert gas is delivered through seal 30 by means of conduit 32 which contains a regulating valve 33 to the bottom of the organosilane material. The amount of organosilane delivered to the tip 10a of the burner 10 and thence into the zone of reaction with the fume silica is controlled by regulating the rate of flow of the inert gas by means of valve 33 and the temperature of the organosilane.

The flow of hydrogen through conduit 17 and its associated parts is controlled by means of valve 18 so that the hydrogen (as well as the silicon tetrachloride vapor) flows through passageway 12 only while the desired reaction is taking place. To insure combustion of the hydrogen and silicon tetrachloride in the presence of the air or oxygen, a pilot flame 34 is provided adjacent the tip 10a of burner 10. This pilot flame is provided with a combustible gas such as hydrogen by means of conduit 35 which contains valve 36.

In the operation of the apparatus of the drawing to provide a treated fume silica, the air supply to burner 10 is first set to the proper value by means of valve 16. Subsequently the hydrogen required for combustible gas pilot flame 34 is provided in the desirable quantities by means of valve 36. After establishing pilot flame 34 and after heating the silicon tetrachloride 21 in vessel 20 to the proper temperature by means of heating element 23, the valve 18 is then opened the proper amount to provide the desired amount of hydrogen in the silicon tetrachloride flow to the tip of the burner, it being understood that the desired flow of hydrogen through the silicon tetrachloride is established in order to obtain the proper amount of water required for hydrolysis of both the silicon tetrachloride and the organosilane. As soon as the hydrogen and silicon tetrachloride reach the tip of the burner through passageway 12, the hydrogen and silicon tetrachloride are ignited by pilot flame 34 and the heat of combustion from the reaction of the hydrogen in the silicon tetrachloride with the oxygen of the air provides a fume or smoke of finely divided, heated, active silica containing the desired degree of moisture depending upon the amount of excess hydrogen introduced into the system. At the same time that the silica issues from the zone of combustion as particles 37, it comes in direct contact with the organosilane issuing from the tip 38 of conduit 29. The zone in which the fume silica comes in contact with the organosilane should be at a temperature below that which would cause carbonization of the organosilane. Generally this zone and the fume silica particles in the zone should be at a temperature below about 500° C. The fume silica in addition to containing the desired amount of water for hydrolysis of the organosilane is at a proper temperature (about 150–500° C.) to accelerate the conversion of the hydrolyzed organosilane from a silanol-containing composition to a polysiloxane composition. These silanol groups undergo further reaction with the silanol

groups on the formed fume silica. This, coupled with the presence of the HCl in the reaction zone, completes the condensation of the silanols both on the fume silica and in the hydrolyzed organosilane to give the fume silica attached to residues of the organosilane through a siloxane

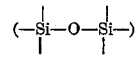

linkage. Thereafter, the fume silica is removed quite readily, because of its particulate, discrete and non-agglomerated state, through a passageway 39 from the reaction chamber 13.

The treated fume silica thus obtained may contain small amounts of HCl but the amounts of HCl present are materially smaller than are usually obtained from fume silica which has not immediately been processed with or subjected to treatment with the organosilane. Because of the surface treatment of the fume silica issuing as very finely divided particles, any HCl present will be more readily evolved and this can be accomplished by merely heating, for instance, at a temperature of about 50–200° C. to obtain a relatively HCl-free fume silica. Alternatively, the HCl can be removed by blowing air or any inert gas through the fume silica particles.

From the foregoing description of the process of the present invention, it is obvious that the method of this invention employing apparatus such as that shown and illustrated is readily adaptable to automatic operation, and particularly on a continuous basis. This would involve bringing together the hydrogen, silicon tetrachloride and air to the point of combustion and simultaneously upon releasing the fume silica formed, bringing the organosilane in contact with the fume silica and thereafter withdrawing the treated silica on a continuous basis.

Although the stoichiometry of the reaction involved in the method of the present invention has been described as comprising more than 2 moles of hydrogen for each mole of silicon tetrachloride and more than one mole of oxygen, it should be understood that the hydrogen, silicon tetrachloride, and oxygen need not be delivered to the reaction chamber 13 in exact stoichiometric proportions to give the desired result of effecting hydrolysis of the silicon tetrachloride and also making available sufficient hydrogen and oxygen to effect conversion of the latter two elements to water to cause hydrolysis of the organosilane. Where an excess of either hydrogen or oxygen is employed, any unreacted material would not interfere with the proper formation of the fume silica and the conversion of the organosilane to the polysiloxane state and optimum treatment of the fume silica. Satisfactory results are obtained when the hydrogen or oxygen, or both the latter two reactants, are provided in excesses of even a factor as high as 10 or more. In the preferred embodiment of our invention, we provide a small stoichiometric excess of hydrogen and an even larger stoichiometric excess of oxygen required to effect the dual hydrolysis reactions, since this insures complete utilization of silicon tetrachloride which, with the organosilane is one of the two most expensive reactants present. By employing such excesses one also insures that all the hydrogen is consumed so that no problem is presented by the escape of excess hydrogen to the atmosphere. As far as the organosilane is concerned, and based on the particular organosilane used and the particle size of the fume silica, one can employ from 0.1 to 5 or more moles of the organosilane per mole of silicon tetrachloride, calculating for optimization of the process, the actual yield of fume silica obtained from the silicon tetrachloride.

As an example of the means for calculation of adequate molar concentrations of ingredients, assuming that each fume silica particle has a radius of about 100 A., for each mole of silicon tetrachloride used in making the fume silica of the above particle size, to coat and treat each particle properly, one would employ at least 0.2 mole trimethylchlorosilane.

Among the organosilanes which may be employed in the practice of the present invention one may mention, for instance, methyltrichlorosilane, dimethyldichlorosilane, trimethylchlorosilane, methyldichlorosilane ($CH_3SiHCl_2$), ethyltrichlorosilane, diethyldichlorosilane, butylitrichlorosilane, divinyldichlorosilane, vinylmethyldchlorosilane, propyldichlorosilane, dipropyldichlorosilane, di-(3-butenyl)dichlorosilane, phenyltrichlorosilane, diphenyldichlorosilane, dimethyldibromosilane, methyl phenyldichlorosilane, methyltriethoxysilane, dimethyldiethoxysilane, dimethyldifluorosilane, dimethyldimethoxysilane, etc.

In order that those skilled in the art may better understand how the present invention may be practiced, the following examples are given by way of illustration and not by way of limitation. All parts are by weight.

*Example 1*

Employing the apparatus shown in the attached drawing, hydrogen gas was passed through silicon tetrachloride while the latter was maintained at a temperature of about 25° C., and the silicon tetrachloride and hydrogen were then led into reaction chamber 13. At the same time, air was passed through conduit 15 and allowed to come in contact with the silicon tetrachloride at the point where the pilot flame 34 was positioned in the reaction chamber. While maintaining trimethylchlorosilane in vessel 25 at a temperature of about 25° C., nitrogen was passed through conduit 32 through the trimethylchlorosilane and thereafter conducted through conduit 29 up to the point where it came to outlet 38. The hydrogen used for entraining the silicon tetrachloride and for combustion with the air was employed at the rate of about 0.8 cubic foot per minute while the air was employed at the rate of about 0.3 cubic foot per minute. The hydrogen entrained the silicon tetrachloride at the rate of about 0.3 cubic foot per minute. The nitrogen used to sweep out and entrain the trimethylchlorosilane was employed at the rate of about 0.03 to 0.1 cubic foot per minute. The nitrogen would carry with it approximately 0.01 to 0.03 cubic foot of trimethylchlorosilane per minute. As the hydrogen and air combined in the pilot flame to cause the formation of water with subsequent hydrolysis of the silicon tetrachloride, there formed a fine gas dispersed group of particles 37 which were contacted immediately with the gaseous trimethylchlorosilane issuing at tip 38. Upon contact of the trimethylchlorosilane with the fine particles of fume silica containing silicon-bonded hydroxyl groups and extra moisture which was present because of the intentional use of a larger amount of hydrogen and air over that required for merely hydrolyzing the silicon tetrachloride to the fume silica state, the trimethylchlorosilane was hydrolyzed on the surface of the silica and affixed itself to the finely dispersed particles through the medium of a siloxane (SiO) linkage, with the formation of a hydrophobic surface having $(CH_3)_3SiO-$ groupings thereon. Thereafter, the finely divided particles were readily removed merely by gravity flow through channel 39 to give a hydrophobic filler. This filler in very finely divided state, when dispersed in water, floated to the surface of the water and remained there, showing the marked hydrophobicity of the particles. Fume silica which was not subjected to the treatment at the time of formation with the trimethylchlorosilane settled to the bottom of he waer and remained in that position, indicating its lack of hydrophobicity.

*Example 2*

In this example hydrogen, air, and silicon tetrachloride were subjected to combustion conditions similarly as in Example 1 with the exception that the amount of hydrogen and air used was approximately twice that employed in Example 1. The finely divided fume silica particles issuing from the combustion zone were then treated with dimethyldichlorosilane employing the same conditions and means for bringing the dimethyldichlorosilane in contact with the fume silica particles as were used in Example 1 in treating the fume silica particles with trimethylchlorosilane. The treated fume silica obtained in this example was also hydrophobic.

The incorporation of the treated fillers in silicone rubber gave a filled composition which was stable at room temperature and showed very little structure or nerve formation which ordinarily attended the use of untreated fillers in combination with the silicone rubber gum. Because of the presence of the organosilicon composition on the filler, it was wet more readily by the organopolysiloxane rubber thus enabling one to use larger proportions of filler. When the latter filled rubber was molded with a curing agent, for instance, benzoyl peroxide, it gave a material which had good tensile strength and elongation characteristics.

It will, of course, be apparent to those skilled in the art that instead of using trimethylchlorosilane or dimethyldichlorosilane, other organosilanes, many examples of which were given above, may be used without departing from the scope of the invention. Among additional values which R may be in the formula found in column 1, line 16, are, for instance, butyl, amyl, benzyl, tolyl, xylyl, naphthyl, chlorophenyl, chloronaphthyl, etc., radicals.

What we claim as new and desire to secure by Letters Patent of the United States is:

1. The process for obtaining a treated silica filler which comprises effecting combustion of silicon tetrachloride in the presence of hydrogen and oxygen and immediately thereafter, while the newly formed fume silica resulting from said combustion is in the finely divided state and is at an elevated temperature below 500° C., contacting said newly formed silica with an organohydrolyzable silane having the formula $$R_mH_nSiX_{4-(m+n)}$$ 

where R is a monovalent hydrocarbon radical, X is a hydrolyzable radical selected from the class consisting of halogen and alkoxy radicals, m is an integer equal to from 1 to 3, and n is a whole number equal to from 0 to 2, the sum of $m+n$ being equal to at most 3, the amount of hydrogen employed being in excess of that required to combine with the oxygen so as to form a sufficient water to convert all the silicon-bonded chlorine atoms in the silicon tetrachloride to silanol groups and to effect hydrolysis of the organohydrolyzable silane.

2. The process as in claim 1 in which the organohydrolyzable silane is trimethylchlorosilane.

3. The process as in claim 1 in which the organohydrolyzable silane is dimethyldichlorosilane.

4. The process for obtaining a hydrophobic fume silica which comprises subjecting silicon tetrachloride to a combustion zone containing hydrogen and oxygen and immediately after combustion of the silicon tetrachloride has taken place to form fume silica in the finely divided state, contacting said fume silica while it is still at a temperature of from 150 to 500° C., with an organohydrolyzable silane having the formula $$R_m H_n SiX_{4-(m+n)}$$

where R is a monovalent hydrocarbon radical, X is a hydrolyzable radical selected from the class consisting of halogen and alkoxy radicals, $m$ is an integer equal to from 1 to 3, $n$ is a whole number equal to from 0 to 2, the sum of $m+n$ being equal to at most 3, there being employed at least 2.1 moles of hydrogen per mole of silicon tetrachloride so that the water formed from the hydrogen and oxygen in the combustion zone is sufficient to convert all the silicon-bonded chlorine atoms in the silicon tetrachloride to silanol groups and to effect hydrolysis of the organohydrolyzable silane.

5. The process as in claim 4 wherein the hydrolyzable silane is trimethylchlorosilane.

References Cited in the file of this patent

UNITED STATES PATENTS

| | | |
|---|---|---|
| 2,306,222 | Patnode | Dec. 22, 1942 |
| 2,567,315 | Bidaud et al. | Sept. 11, 1951 |
| 2,589,705 | Kistler | Mar. 18, 1952 |
| 2,767,519 | Bjorksten | Oct. 23, 1956 |
| 2,819,151 | Flemmert | Jan. 7, 1958 |
| 2,859,198 | Sears et al. | Nov. 4, 1958 |